US011990269B2

(12) United States Patent
Chang et al.

(10) Patent No.: US 11,990,269 B2
(45) Date of Patent: May 21, 2024

(54) INDUCTOR DEVICE THAT CAN RESIST EXTERNAL INTERFERENCE AND ADJUST INDUCTANCE VALUE AND QUALITY FACTOR OF INDUCTOR

(71) Applicant: Realtek Semiconductor Corp., HsinChu (TW)

(72) Inventors: Yang Chang, HsinChu (TW); Chia-Yi Lee, HsinChu (TW); Chia-Jun Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 103 days.

(21) Appl. No.: 17/531,796

(22) Filed: Nov. 21, 2021

(65) Prior Publication Data

US 2023/0049051 A1 Feb. 16, 2023

(30) Foreign Application Priority Data

Aug. 10, 2021 (TW) ................................ 110129485

(51) Int. Cl.
*H01F 27/42* (2006.01)
*H01F 27/40* (2006.01)

(52) U.S. Cl.
CPC ......... *H01F 27/425* (2013.01); *H01F 27/402* (2013.01)

(58) Field of Classification Search
CPC .. H01F 27/425; H01F 27/402; H01F 27/2804; H01F 21/12; H01F 21/005; H01F 2027/2809
USPC ........................................................... 361/35
See application file for complete search history.

(56) References Cited

U.S. PATENT DOCUMENTS 8,531,250 B1 * 9/2013 Luschas ............... H03B 5/1228 336/200
2005/0068146 A1 * 3/2005 Jessie .................. H01L 23/5227 336/200
2019/0089304 A1 * 3/2019 Moslehi Bajestan ... H01F 21/12
2019/0180931 A1 * 6/2019 Yoo ......................... H01F 38/14

FOREIGN PATENT DOCUMENTS

CN 102483984 A 5/2012
TW 201935497 A 9/2019

OTHER PUBLICATIONS

P. Agarwal, Partha Pratim Pande and D. Heo, “25.3 GHZ, 4.1 mW VCO with 34.8% tuning range using a switched substrate-shield inductor,” 2015 IEEE MTT-S International Microwave Symposium, Phoenix, AZ, USA, 2015, pp. 1-4, doi: 10.1109/MWSYM.2015.7166890 (Year: 2015).*

(Continued)

*Primary Examiner* — Thienvu V Tran
*Assistant Examiner* — Sreeya Sreevatsa
(74) *Attorney, Agent, or Firm* — Winston Hsu

(57) ABSTRACT

An inductor device includes a first inductor, a second inductor, and at least one switch circuit. The second inductor is arranged to enclose the first inductor, and use a topmost layer metal to resist external interference for the first inductor. The at least one switch circuit is coupled to the second inductor, and is arranged to receive at least one control voltage, wherein the at least one control voltage is arranged to adjust conduction degree of the at least one switch circuit.

8 Claims, 6 Drawing Sheets

(56) References Cited

OTHER PUBLICATIONS

S. N. Ali et al., "A 40% PAE Frequency-Reconfigurable CMOS Power Amplifier With Tunable Gate-Drain Neutralization for 28-GHz 5G Radios", IEEE Transactions on Microwave Theory and Techniques, 2231-2245 66-5, IEEE, USA ,Feb. 19, 2018.
H. Yen et al., "Closed loop structure to prevent couplings on CMOS process", 2016 IEEE International Symposium on Electromagnetic Compatibility (EMC), 46-49, IEEE, USA ,Sep. 22, 2016.

* cited by examiner

INDUCTOR DEVICE THAT CAN RESIST EXTERNAL INTERFERENCE AND ADJUST INDUCTANCE VALUE AND QUALITY FACTOR OF INDUCTOR

BACKGROUND OF THE INVENTION

1. Field of the Invention

The present invention is related to inductor design, and more particularly, to an inductor device that can resist external interference and adjust an inductance value and a quality factor (Q) of an inductor.

2. Description of the Prior Art

A conventional adjustable inductor device includes a primary inductor and a secondary inductor, wherein a pattern ground shield under the primary inductor has the secondary inductor and a switch circuit that is connected in series with the secondary inductor. The characteristics of the secondary inductor may be adjusted by adjusting the voltage of the switch circuit to change a conduction degree of the switch circuit, and an inductance value and a quality factor of the primary inductor may be adjusted by the mutual induction. This adjustable inductor device may not be capable of resisting external interference (e.g. magnetic field interference or signal coupling), however.

A conventional inductor device that can resist external interference uses a topmost layer metal (e.g. a redistribution layer (RDL) metal) to enclose a floating closed loop on the periphery of an inductor. According to Lenz's law, the closed loop may enable the inductor to resist external interference; however, the quality factor of the inductor will be reduced. In addition, the inductance value and the quality factor of the inductor are not adjustable, which greatly reduces the freedom of circuit design.

In light of the above, an inductor device that can resist external interference and adjust an inductance value and a quality factor of an inductor in order to reach the objectives of increased freedom of circuit design and ability to resist external interference is urgently needed.

SUMMARY OF THE INVENTION

It is therefore one of the objectives of the present invention to provide an inductor device that can resist external interference and adjust an inductance value and a quality factor of an inductor, to address the above-mentioned issues.

At least one embodiment of the present invention provides an inductor device. The inductor device may include a first inductor, a second inductor, and at least one switch circuit. The second inductor is arranged to enclose the first inductor, and use a topmost layer metal to resist external interference for the first inductor. The at least one switch circuit is coupled to the second inductor, and is arranged to receive at least one control voltage, wherein the at least one control voltage is arranged to adjust a conduction degree of the at least one switch circuit.

One of the benefits of the inductor device of the present invention is that, since the second inductor uses the topmost layer metal, the first inductor enclosed therein may be protected from external interference. In addition, the inductor device of the present invention may adjust the inductance value, the quality factor of the first inductor and the ability to resist external interference by adjusting the conduction degree of the at least one switch circuit, which greatly increases the freedom of circuit design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
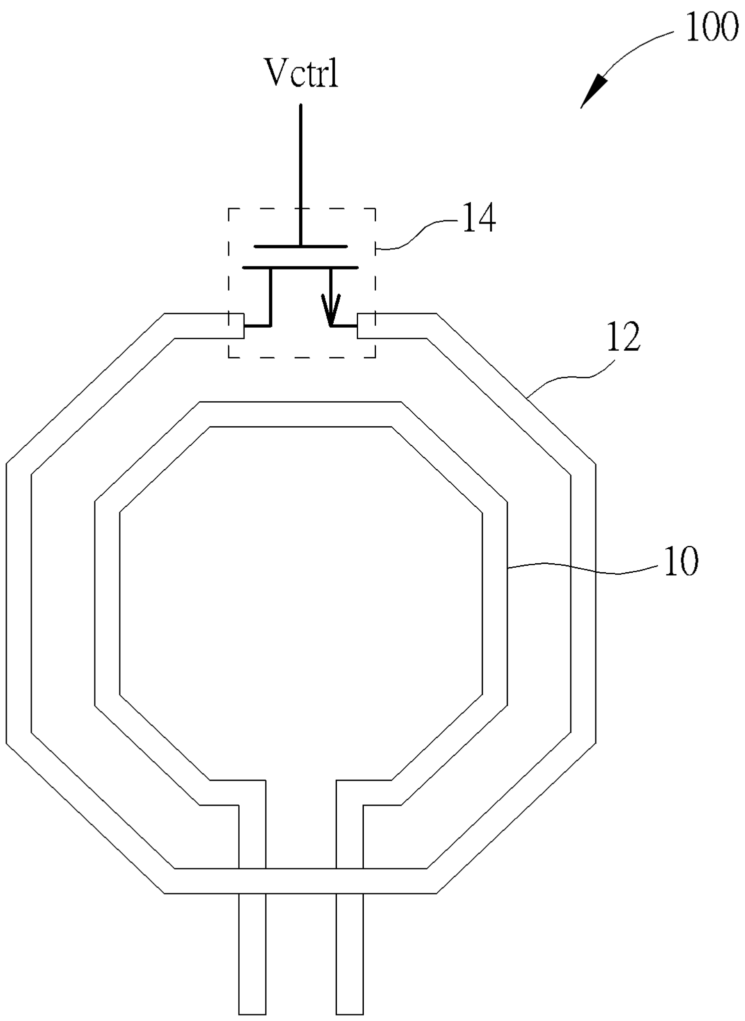
FIG. 1 is a diagram illustrating an inductor device according to an embodiment of the present invention.

FIG. 1 is a diagram illustrating an inductor device 100 according to an embodiment of the present invention. As shown in FIG. 1, the inductor device 100 includes a primary inductor 10, a secondary inductor 12, and an N-type Metal-Oxide-Semiconductor Field-Effect Transistor (MOSFET; for brevity, referred to herein as a "transistor") 14, wherein the N-type transistor 14 acts as a switch circuit of the inductor device 100. In practice, the switch circuit may be replaced by other types of switch circuit (e.g. a P-type transistor). The switch circuit that is represented by an N-type transistor is for illustrative purposes only, and is not meant to be a limitation of the present invention. In addition, the switch circuit is not limited to be a single switch circuit coupled to the secondary inductor 12, and multiple switching circuits may be coupled in parallel between the secondary inductor 12 and ground, which may also achieve the effect of the present invention.

In FIG. 1, the primary inductor 10 may be an inductor of any number of turns (i.e. a single turn or multiple turns) or an inductor of any width, wherein a single turn is taken as an example. The secondary inductor 12 is arranged to enclose the primary inductor 10, and use a topmost layer metal (e.g. an RDL metal) to resist external interference (e.g. magnetic field interference or signal coupling) for the primary inductor 10, wherein no matter whether the secondary inductor 12 is floating or grounded, the effect of resisting external interference for the primary inductor 10 will not be affected. In addition, the secondary inductor 12 may be an inductor of any number of layers (i.e. a single layer or multiple layers) or an inductor of any width, wherein a single layer is taken as an example in FIG. 1. Please note that the traces between the primary inductor 10 and the secondary inductor 12 may be any distance, and whether there is a pattern ground shield under the primary inductor 10 and the secondary inductor 12 does not affect the effect of the present invention.

In FIG. 1, the N-type transistor 14 is coupled to the secondary inductor 12, and is arranged to receive a control voltage Vctrl at a gate terminal of the N-type transistor 14, wherein the control voltage Vctrl is arranged to adjust the conduction degree of the N-type transistor 14. In some embodiments, a power detector may be coupled to the gate terminal of the N-type transistor 14 to detect a sensing voltage, for adaptively controlling and adjusting the conduction degree of the N-type transistor 14, but the present invention is not limited thereto. In addition, the degree of external interference resistance of the secondary inductor 12 for the primary inductor 10 and the quality factor and the inductance value of the primary inductor 10 may be adjusted according to the conduction degree of the N-type transistor 14, and two cases (case 1 and case 2) are detailed below to illustrated this.

In case 1, when the inductor device 100 has no need to resist the external interference for the primary inductor 10 or adjust the quality factor or the inductance value of the primary inductor 10 (i.e. the primary inductor 10 is operated as a general inductor), the control voltage Vctrl is set at 0V (or a voltage value smaller than a threshold voltage of the N-type transistor 14). Since the control voltage Vctrl is smaller than the threshold voltage (which is approximately equal to 0.45V) of the N-type transistor 14, the N-type transistor 14 will not turn on and the secondary inductor 12 will not form a loop. At this moment, the secondary inductor 12 is the same as a dummy inductor, which will not affect the quality factor and the inductance value of the primary inductor 10. In other words, when the N-type transistor 14 turns off, although the primary inductor 10 is enclosed by the secondary inductor 12, it does not affect the operation of the primary inductor 10 except for adding some layout area in the manufacturing process.

On the other hand, incase 2, when the inductor device 100 needs to resist the external interference for the primary inductor 10, the inductor device 100 sets the control voltage Vctrl as a voltage value higher than the threshold voltage (which is approximately equal to 0.45V) of the N-type transistor 14, to make the N-type transistor 14 turn on. At this moment, the secondary inductor 12 will form a closed loop to resist the external interference for the primary inductor 10. In addition, the higher the control voltage Vctrl is, the more conductive the N-type transistor 14 is (i.e. the smaller an equivalent resistance of the N-type transistor 14 is). Due to Lenz's law, the loop current of the secondary inductor 12 will be greater, and the primary inductor 10 enclosed by the secondary inductance 12 will be more immune to the external interference. Additionally, when the inductor device 100 needs to adjust the quality factor and the inductance value of the primary inductor 10, the inductor device 100 will adjust the magnitude of the control voltage Vctrl. When the control voltage Vctrl is higher, the quality factor and the inductance value of the primary inductor 10 will be smaller, and a gain of a matching circuit using the inductor device 100 will decrease. As a result, the inductor device 100 is capable of achieving the effect of adjusting an impedance of the matching circuit using the inductor device 100 or reducing the gain of the matching circuit using the inductor device 100, which greatly increases the freedom of the circuit design.

Figure 2:
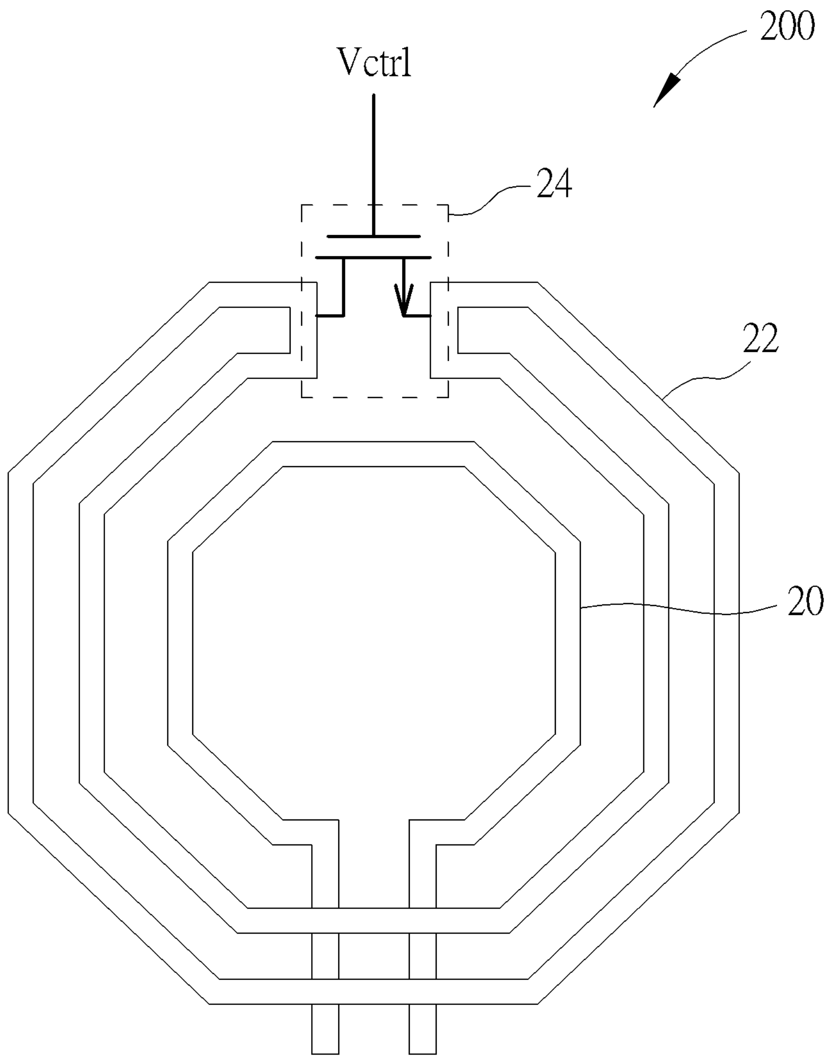
FIG. 2 is a diagram illustrating an inductor device according to another embodiment of the present invention.

FIG. 2 is a diagram illustrating an inductor device 200 according to another embodiment of the present invention. As shown in FIG. 2, the inductor device 200 includes a primary inductor 20, a secondary inductor 22, and an N-type transistor 24. The secondary inductor 22 is arranged to enclose the primary inductor 20, and use the topmost layer metal (e.g. the RDL metal) to resist external interference (e.g. magnetic field interference or signal coupling) for the primary inductor 20. The N-type transistor 24 is coupled to the secondary inductor 22, and is arranged to receive a control voltage Vctrl to adjust the conduction degree of the N-type transistor 24. The difference between the inductor device 200 and the inductor device 100 shown in FIG. 1 is that the secondary inductor 22 is two layers (the secondary inductor 12 in FIG. 1 is a single layer). The inductor device 200 having a secondary inductance 22 which is multilayered may still resist external interference for the primary inductor 20 or adjust the inductance value and the quality factor of the primary inductor 20 according to the conduction degree of the N-type transistor 24. For brevity, similar descriptions for this embodiment are not repeated in detail here.

Figure 3:
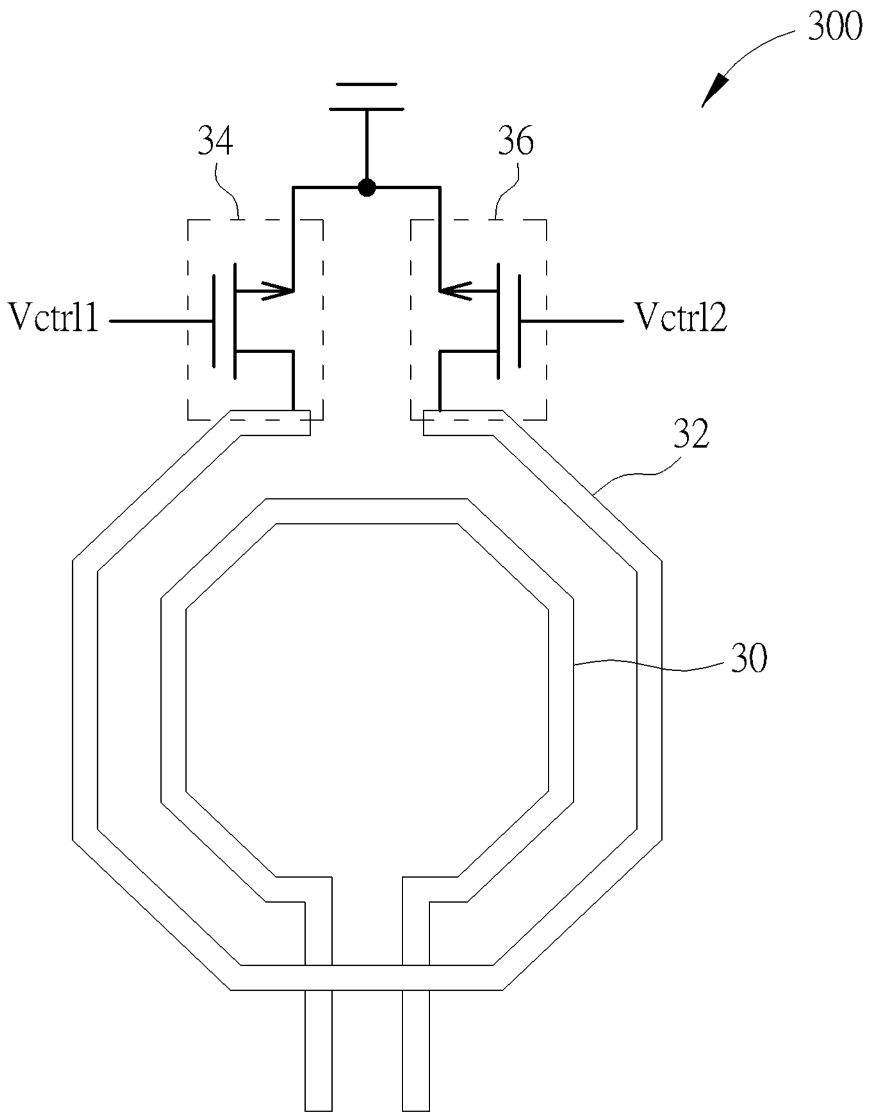
FIG. 3 is a diagram illustrating an inductor device according to still another embodiment of the present invention.

FIG. 3 is a diagram illustrating an inductor device 300 according to still another embodiment of the present invention. As shown in FIG. 3, the inductor device 300 includes a primary inductor 30, a secondary inductor 32, and two N-type transistors 34 and 36. The secondary inductor 32 is arranged to enclose the primary inductor 30, and use the topmost layer metal (e.g. the RDL metal) to resist external interference (e.g. magnetic field interference or signal coupling) for the primary inductor 30. The N-type transistors 34 and 36 are coupled in parallel between the secondary inductor 32 and ground, and are arranged to receive two control voltages Vctrl1 and Vctrl2 to adjust the conduction degree of the N-type transistors 34 and 36, respectively. The difference between the inductor device 300 and the inductor device 100 shown in FIG. 1 is that the inductor device 300 has a plurality of switch circuits (i.e. the N-type transistors 34 and 36). The inductor device 300 having a plurality of switch circuits that are coupled to the secondary inductor 32 may still resist external interference for the primary inductor 30 or adjust the inductance value and the quality factor of the primary inductor 30 according to the conduction degree of the plurality of switch circuits. For brevity, similar descriptions for this embodiment are not repeated in detail here.

Figure 4:
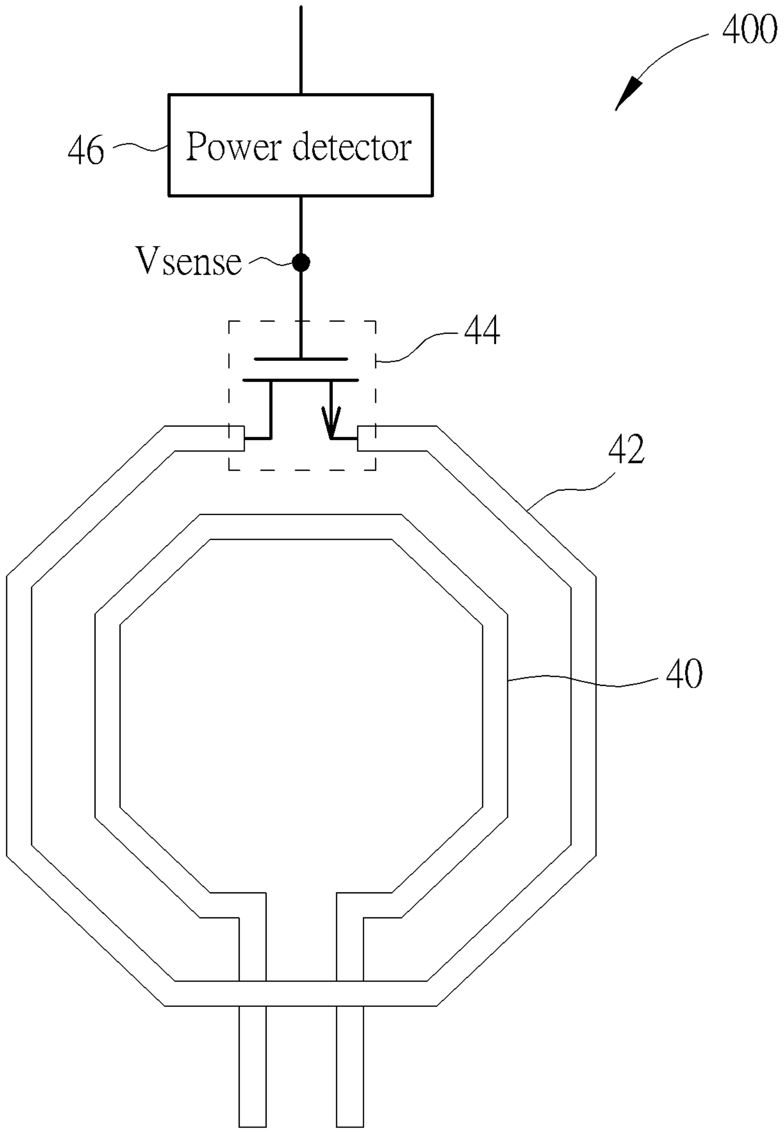
FIG. 4 is a diagram illustrating an inductor device that uses a sensing voltage provided by a power detector to adaptively adjust a conduction degree according to an embodiment of the present invention.

FIG. 4 is a diagram illustrating an inductor device 400 that uses a sensing voltage provided by a power detector to adaptively adjust a conduction degree according to an embodiment of the present invention. As shown in FIG. 4, the inductor device 400 includes a primary inductor 40, a secondary inductor 42, an N-type transistor 44, and a power detector 46. The secondary inductor 42 is arranged to enclose the primary inductor 40, and use the topmost layer metal (e.g. the RDL metal) to resist external interference (e.g. magnetic field interference or signal coupling) for the primary inductor 40. The N-type transistor 44 is coupled to the secondary inductor 42, and is arranged to receive a sensing voltage Vsense provided by the power detector 46 as a gate voltage, in order to adjust the conduction degree of the N-type transistor 44. The sensing voltage Vsense may be generated by sensing the voltage at any place in the matching circuit using the inductor device 400 according to design requirements, without the need for a voltage generation circuit (e.g. a voltage stabilizing circuit) to generate and input an additional voltage (e.g. the control voltage Vctrl in FIG. 1) to the gate terminal of the N-type transistor 44. The convenience of circuit design may be greatly improved thereby. As a result, the inductor device 400 may resist external interference for the primary inductor 40 or adjust the inductance value and the quality factor of the primary inductor 40 according to the conduction degree of the N-type transistor 44. For brevity, similar descriptions for this embodiment are not repeated in detail here.

Figure 5:
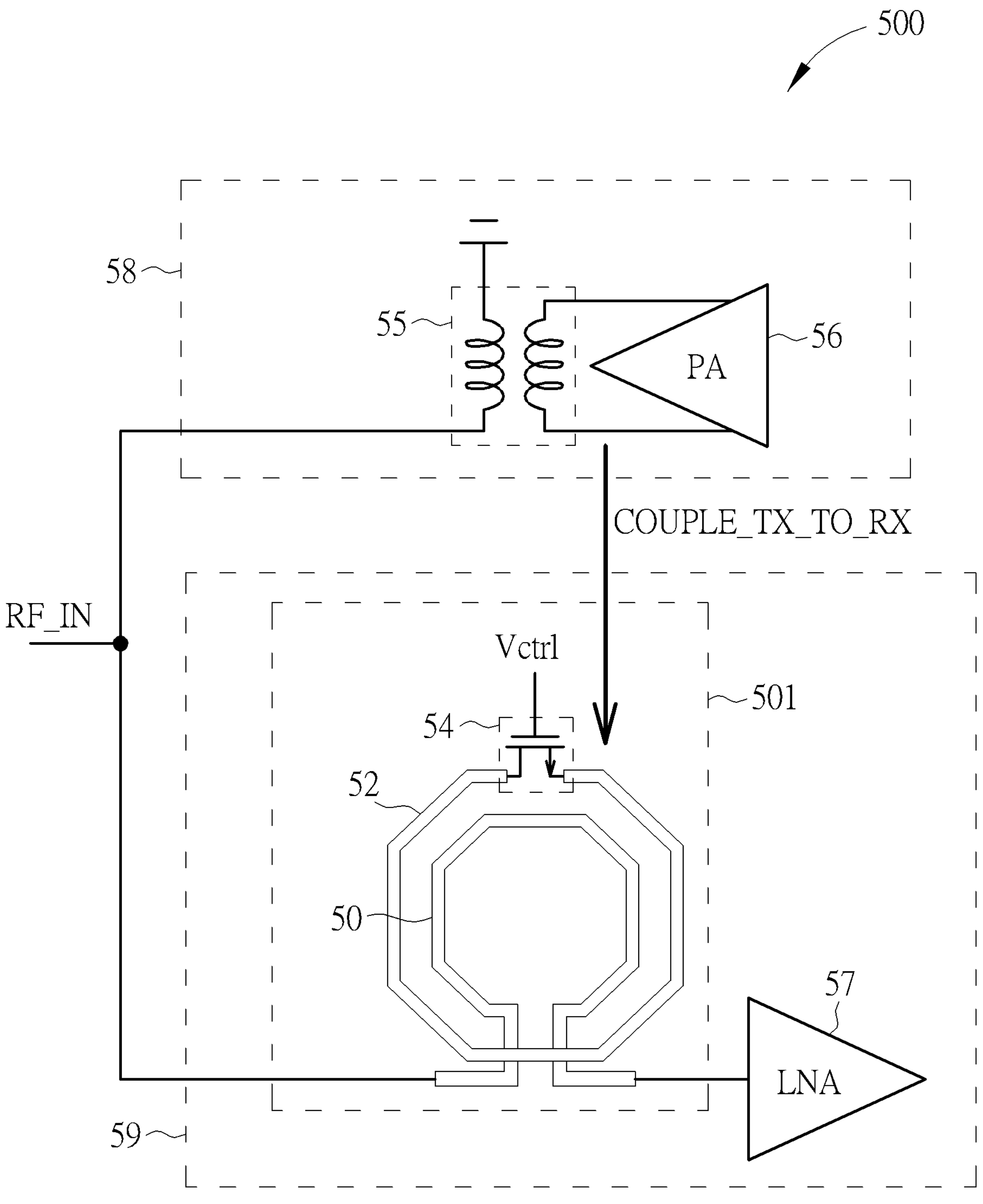
FIG. 5 is a diagram illustrating a transceiver system that uses the inductor device shown in FIG. 1 at a receiving terminal according to an embodiment of the present invention.

FIG. 5 is a diagram illustrating a transceiver system 500 that uses the inductor device 100 shown in FIG. 1 at a receiving terminal according to an embodiment of the present invention. As shown in FIG. 5, the transceiver system 500 is arranged to receive a radio frequency (RF) input signal RF_IN, and includes a transmitting terminal 58 and a receiving terminal 59. The transmitting terminal 58 includes a balun 55 and a power amplifier (PA) 56, and the receiving terminal 59 includes a low noise amplifier (LNA) 57 and an inductor device 501. The inductor device 501 includes a primary inductor 50, a secondary inductor 52, and an N-type transistor 54, and may be implemented by the inductor device 100 shown in FIG. 1. For brevity, descriptions for the inductor device 501 which are similar to those of FIG. 1 are not repeated in detail here. Due to the limitation of the layout size, the balun 55 in the transmitting terminal 58 may be very close to the primary inductor 50 of the inductor device 501 in the receiving terminal 59. As a result, an interference signal COUPLE_TX_TO_RX may be coupled from the balun 55 in the transmitting terminal 58 to the receiving terminal 59, which makes the signal received by the receiving terminal 59 too large. To address this issue, the transceiver system 500 may use the inductor device 501 provided by the present invention to replace the general inductor at the receiving terminal 59. The following will describe the high gain mode and the low gain mode of the receiving terminal 59 of the transceiver system 500.

In the high gain mode of the receiving terminal 59, since the RF input signal RF_IN is very small, the interference signal COUPLE_TX_TO_RX coupled from the balun 55 in the transmitting terminal 58 to the receiving terminal 59 may be ignored. As a result, the control voltage Vctrl received by the gate terminal of the N-type transistor 54 may be set to be a voltage smaller than the threshold voltage of the N-type transistor 54 (e.g. 0V), so that the N-type transistor 54 will not turn on and the secondary inductor 52 will not form a loop. At this moment, the secondary inductor 52 is the same as a dummy inductor, and will not affect the inductance value and the quality factor of the primary inductor 50, thereby the inductance value and the quality factor of the primary inductor 50 required in the high gain mode (i.e. high inductance value and high quality factor) may be maintained.

In the low gain mode of the receiving terminal 59, since the RF input signal RF_IN is very large, the transceiver system 500 has to reduce the gain of the LNA 57, and the interference signal COUPLE_TX_TO_RX coupled from the balun 55 in the transmitting terminal 58 to the receiving terminal 59 will seriously affect the characteristics of the transceiver system 500. As this moment, the control voltage Vctrl received by the gate terminal of the N-type transistor 54 may be set to be a voltage higher than the threshold voltage of the N-type transistor 54 (e.g. 1V), so that the N-type transistor 54 will turn on and the secondary inductor 52 will form a closed loop to resist external interference (i.e. the interference signal COUPLE_TX_TO_RX) for the primary inductor 50. It should be noted that, when the control voltage Vctrl is set higher, the ability of the secondary inductor 52 to resist external interference for the primary inductor 50 will be stronger. When the control voltage Vctrl is set higher, however, the inductance value and the quality factor of the primary inductor 50 will be lower. As a result, the gain of the LNA 57 may be reduced.

Figure 6:
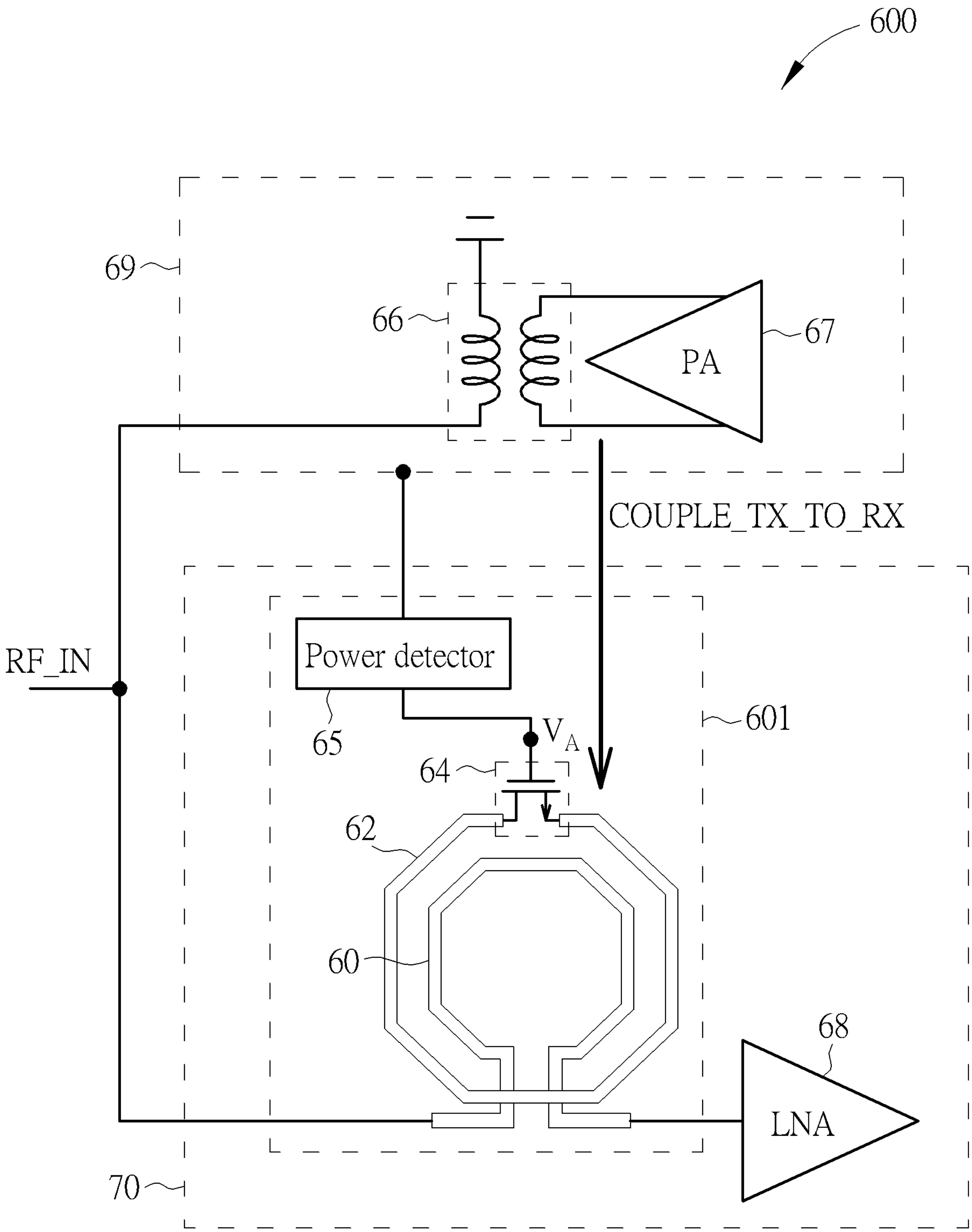
FIG. 6 is a diagram illustrating a transceiver system that uses the inductor device shown in FIG. 4 at a receiving terminal according to an embodiment of the present invention.

FIG. 6 is a diagram illustrating a transceiver system 600 that uses the inductor device 400 shown in FIG. 4 at a receiving terminal according to an embodiment of the present invention. As shown in FIG. 6, the transceiver system 600 is arranged to receive an RF input signal RF_IN, and includes a transmitting terminal 69 and a receiving terminal 70. The transmitting terminal 69 includes a balun 66 and a PA 67, and the receiving terminal 70 includes an LNA 68 and an inductor device 601. The inductor device 601 includes a primary inductor 60, a secondary inductor 62, an N-type transistor 64, and a power detector 65, and may be implemented by the inductor device 400 shown in FIG. 4. For brevity, descriptions for the inductor device 601 which are similar to FIG. 4 are not repeated in detail here. Please note that one terminal of the power detector 65 is coupled to the gate terminal of the N-type transistor 64, and the other terminal of the power detector 65 is coupled to any node in the transmitting terminal 69. By detecting the voltage of the node in the transmitting terminal 69, a sensing voltage V A may be generated and provided to the gate terminal of the N-type transistor 64, and the conduction degree of the N-type transistor 64 may be automatically adjusted according to the sensing voltage $V_A$.

In this embodiment, when the RF input signal RF_IN is too large, the balun 66 in the transmitting terminal 69 may be very close to the primary inductor 60 of the inductor device 601 in the receiving terminal 70 due to the limitation of the layout size. As a result, an interference signal COUPLE_TX_TO_RX may be coupled from the balun 66 in the transmitting terminal 69 to the receiving terminal 70, and the signal received by the receiving terminal 70 may be too large, which may cause some non-linear problems. To address the above-mentioned issues, the transceiver system 600 may use the inductor device 601 provided by the present invention to replace the general inductor at the receiving terminal 70. The following will describe the high gain mode and the low gain mode of the receiving terminal 70 of the transceiver system 600.

In the high gain mode of the receiving terminal 70, since the RF input signal RF_IN is very small, the voltage of the node in the transmitting terminal 69 detected by the power detector 65 is also very small. As a result, the sensing voltage $V_A$ is also very small (e.g. smaller than the threshold voltage of the N-type transistor 64), so that the N-type transistor 64 will not turn on and the secondary inductor 62 will not form a loop. At this moment, the secondary inductor 62 is the same as a dummy inductor, and will not affect the inductance value and the quality factor of the primary inductor 60, thereby the inductance value and the quality factor of the primary inductor 60 required in the high gain mode (i.e. high inductance value and high quality factor) may be maintained.

In the low gain mode of the receiving terminal 70, since the RF input signal RF_IN is very large, the transceiver system 600 has to reduce the gain of the LNA 68, and the interference signal COUPLE_TX_TO_RX coupled from the balun 66 in the transmitting terminal 69 to the receiving terminal 70 will seriously affect the characteristics of the transceiver system 600. As this moment, the sensing voltage V A will increase as the RF input signal RF_IN becomes larger (higher than the threshold voltage of the N-type transistor 64), so that the N-type transistor 64 will turn on and the secondary inductor 62 will form a closed loop to resist external interference (i.e. the interference signal COUPLE_TX_TO_RX) for the primary inductor 60. It should be noted that, when the RF input signal RF_IN is larger, the sensing voltage $V_A$ will be higher and the N-type transistor 64 will be more conductive. In addition, the ability of the secondary inductor 62 to resist external interference for the primary inductor 60 will be stronger. When the RF input signal RF_IN is larger, however, the inductance value and the quality factor of the primary inductor 60 will be lower. As a result, the gain of the LNA 68 may be reduced.

In summary, compared with the transceiver system 500 shown in FIG. 5, the transceiver system 600 shown in FIG. 6 may generate the sensing voltage $V_A$ by the power detector 65, and automatically adjust the conduction degree of the N-type transistor 64 according to the sensing voltage $V_A$, to determine whether to resist external interference for the primary inductor 60 or adjust the inductance value and the quality factor of the primary inductor 60. The transceiver system 600 has no need for a voltage generation circuit (e.g. a voltage stabilizing circuit) to set an additional voltage (e.g. the control voltage Vctrl in FIG. 5) to control the conduction degree of the N-type transistor 64.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inductor device, comprising:

a first inductor;

a second inductor, arranged to enclose the first inductor, and use a topmost layer metal to resist external interference for the first inductor; and at least one switch circuit, coupled to the second inductor, and arranged to receive at least one control voltage, wherein the at least one control voltage is arranged to adjust a conduction degree of the at least one switch circuit;

wherein in response to the at least one switch circuit being turned on, a magnitude of the at least one control voltage is adjusted to be greater than a threshold voltage of the at least one switch circuit, and is further adjusted to adjust a quality factor or an inductance value of the first inductor.

2. The inductor device of claim 1, wherein the number of turns of the first inductor is a single turn or multiple turns.

3. The inductor device of claim 1, wherein the number of layers of the second inductor is a single layer or multiple layers.

4. The inductor device of claim 1, wherein when the inductor device has no need to resist external interference, the at least one switch circuit is made non-conducting.

5. The inductor device of claim 1, wherein when the inductor device needs to resist external interference or adjust the quality factor or the inductance value of the first inductor, the conduction degree of the at least one switch circuit is adjusted.

6. The inductor device of claim 5, wherein the conduction degree of the at least one switch circuit is directly proportional to the ability of the second inductor to resist external interference.

7. The inductor device of claim 5, wherein the conduction degree of the at least one switch circuit is indirectly proportional to the quality factor and the inductance value of the first inductor.

8. The inductor device of claim 1, further comprising:

a power detector, coupled to the at least one switch circuit, and arranged to provide the at least one control voltage to the at least one switch circuit.

* * * * *